(12) United States Patent  
Brown et al.

(10) Patent No.: US 9,279,584 B2
(45) Date of Patent: Mar. 8, 2016

(54) HEAT SHIELD FOR FEED INJECTOR

(71) Applicant: General Electric Company, Schenectady, NY (US)

(72) Inventors: Cillian Gerard Brown, Houston, TX (US); Wade Albert Taber, Katy, TX (US); Daniel Adrian Corral, Humble, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 431 days.

(21) Appl. No.: 13/840,043

(22) Filed: Mar. 15, 2013

(65) Prior Publication Data
US 2014/0263747 A1 Sep. 18, 2014

(51) Int. Cl.
F23D 14/48 (2006.01)
B23P 15/26 (2006.01)
F28F 21/04 (2006.01)
C10J 3/30 (2006.01)
C10J 3/50 (2006.01)

(52) U.S. Cl.
CPC ............... *F23D 14/48* (2013.01); *B23P 15/26* (2013.01); *C10J 3/30* (2013.01); *C10J 3/50* (2013.01); *F28F 21/04* (2013.01); *C10J 2200/15* (2013.01); *C10J 2300/0959* (2013.01); *Y02E 20/16* (2013.01); *Y02E 20/18* (2013.01); *Y10T 29/49947* (2015.01)

(58) Field of Classification Search
CPC ............... C10J 3/00; C10J 3/30; C10J 3/50; F23D 14/48; Y10T 29/49947; F28F 21/04
See application file for complete search history.

(56) References Cited

U.S. PATENT DOCUMENTS

| 4,520,601 | A | * | 6/1985 | Stacey, Jr. ............... B64G 1/58 244/159.4 |
| 5,107,641 | A | * | 4/1992 | Davis .................. E04F 13/0835 110/338 |
| 5,273,212 | A | | 12/1993 | Gerhardus et al. |
| 5,337,961 | A | | 8/1994 | Brambani et al. |
| 5,785,721 | A | | 7/1998 | Brooker |
| 5,934,206 | A | | 8/1999 | Saxon et al. |
| 5,941,459 | A | | 8/1999 | Brooker et al. |

(Continued)

FOREIGN PATENT DOCUMENTS

EP 1256712 A2 11/2002

OTHER PUBLICATIONS

PCT Search Report and Written Opinion issued Apr. 16, 2014 in connection with corresponding PCT Patent Application No. PCT/US2014/017959.

*Primary Examiner* — Matthew Merkling
(74) *Attorney, Agent, or Firm* — Fletcher Yoder, P.C.

(57) ABSTRACT

A system includes a gasification feed injector. The gasification feed injector includes a tip portion that has an outer wall and a feed outlet, and an injection axis of the gasification feed injector extends through the feed outlet of the tip portion. The gasification feed injector also has at least one fastener extending radially from the outer wall relative to an injection axis of the gasification feed injector through the feed outlet of the tip portion. An attachment location of the at least one fastener is located away from the feed outlet of the tip portion. The system also includes a heat shield, which includes a tile radially disposed on the at least one fastener and radially secured to the outer wall via fastening the tile to the at least one fastener. In addition, the tile wraps around a distal end portion of the tip portion.

18 Claims, 6 Drawing Sheets

(56) References Cited

U.S. PATENT DOCUMENTS

| | | |
|---|---|---|
| 6,152,052 A | 11/2000 | Saxon et al. |
| 6,276,611 B1 | 8/2001 | Brooker et al. |
| 6,575,738 B1 * | 6/2003 | Nguyen .................. F27D 3/022 138/149 |
| 6,755,355 B2 | 6/2004 | Whittaker |
| 6,892,654 B2 | 5/2005 | Whittaker et al. |
| 7,070,126 B2 * | 7/2006 | Shinogle ................ F02M 53/04 123/470 |
| 7,993,131 B2 | 8/2011 | Douglas |
| 2011/0162376 A1 | 7/2011 | Guo |
| 2012/0036776 A1 | 2/2012 | Stevenson et al. |

* cited by examiner

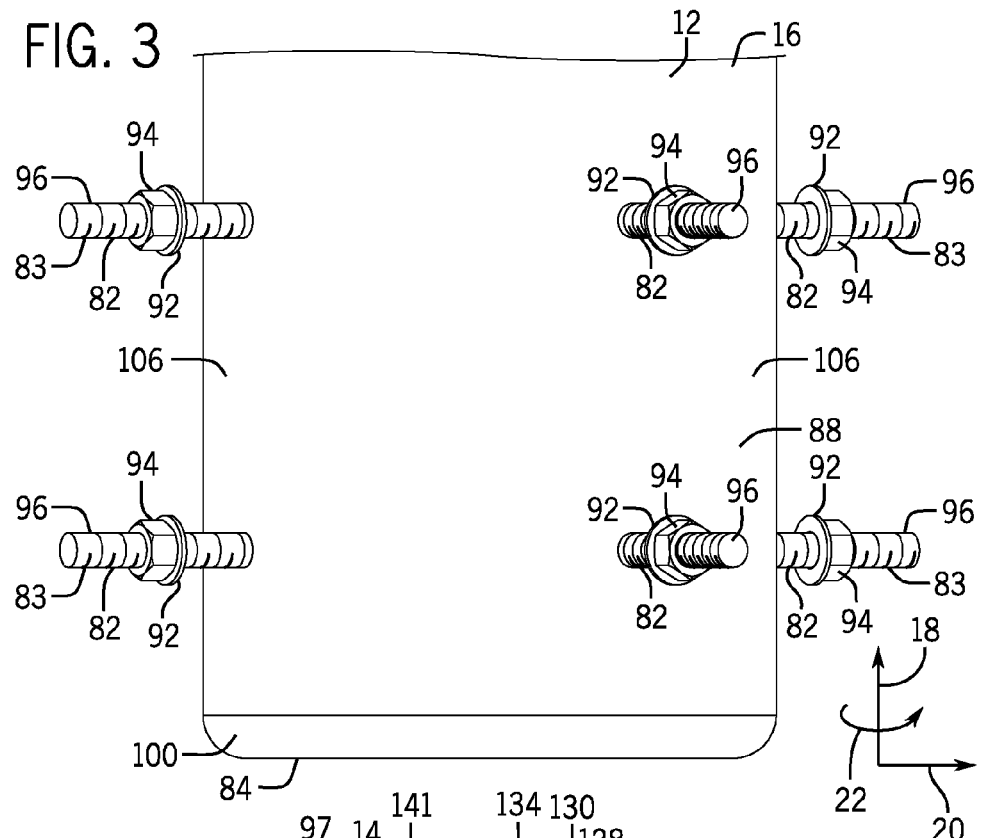
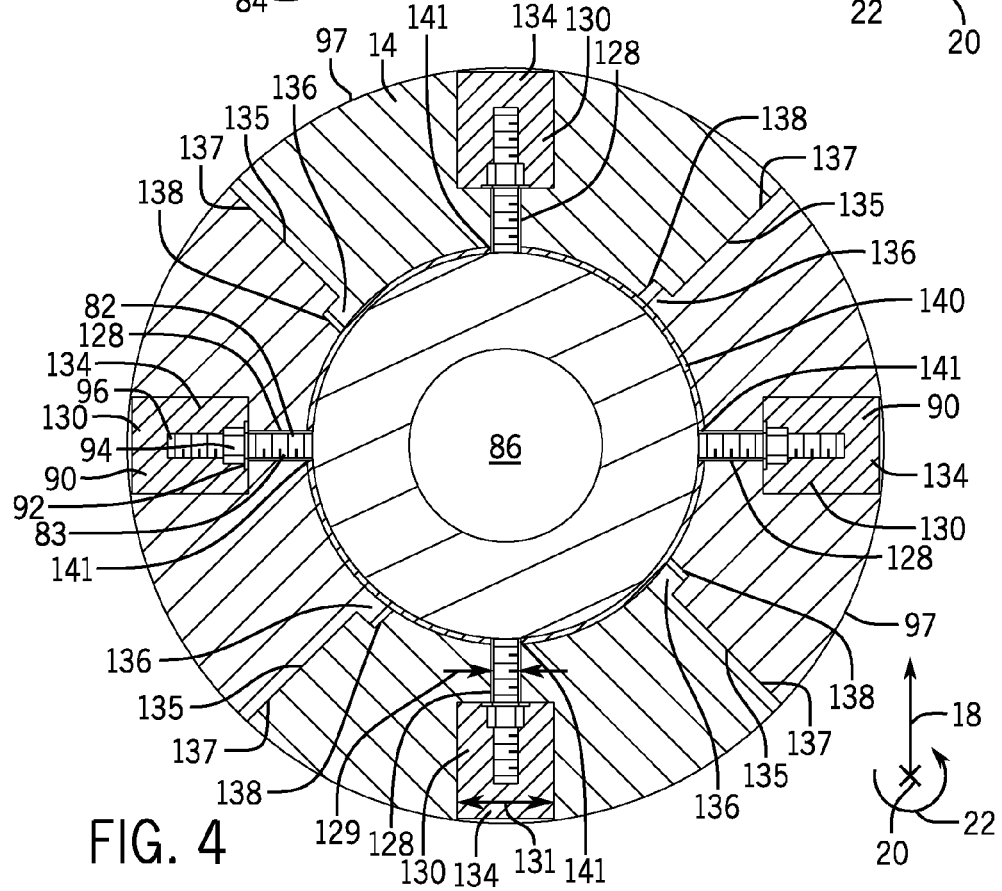

HEAT SHIELD FOR FEED INJECTOR

BACKGROUND OF THE INVENTION

The subject matter disclosed herein relates to feed injectors, and, more particularly, to a heat shield for feed injectors.

A variety of reactors and combustion systems employ feed injectors to inject a fuel or feedstock into a chamber, combustion chamber. For example, an integrated gasification combined cycle (IGCC) power plant includes a gasifier with one or more feed injectors. The feed injectors supply a carbonaceous feedstock, such as an organic feedstock or a coal slurry, into the gasifier along with oxygen and steam to generate a syngas. In general, a partial combustion or gasification reaction occurs downstream from the feed injectors. However, a flame and/or heat from combustion in close proximity to the feed injectors can reduce the life of the feed injectors, particularly if the feed injectors exceed certain temperatures. For example, the feed injector may be subject to increasingly greater temperatures toward the tip and/or other locations close to the flame. The lives of feed injectors may be reduced by such high temperatures.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasification feed injector. The gasification feed injector includes a tip portion that has an outer wall and a feed outlet, and an injection axis of the gasification feed injector extends through the feed outlet of the tip portion. The gasification feed injector also has at least one fastener extending radially from the outer wall relative to the injection axis. An attachment location of the at least one fastener is located away from the feed outlet of the tip portion. The system also includes a heat shield, which includes a tile radially disposed on the at least one fastener and radially secured to the outer wall via fastening the tile to the at least one fastener. In addition, the tile wraps around a distal end portion of the tip portion.

In a second embodiment, a system includes a heat shield for a gasification feed injector. The heat shield includes at least one ceramic tile configured to be radially disposed onto a fastener extending from an outer wall of a tip portion of the gasification feed injector. The fastener extends radially from the outer wall relative to an injection axis of the gasification feed injector through a feed outlet of the tip portion, and the at least one ceramic tile is configured to be radially secured to the outer wall via fastening the tile to the fastener. In addition, the at least one ceramic tile is configured to wrap around a distal end portion of the tip portion.

In a third embodiment, a method includes radially disposing at least one ceramic tile having an opening onto a fastener extending from an outer wall of a tip portion of a gasification feed injector by inserting the fastener into the opening. The fastener extends radially from the outer wall relative to an injection axis of the gasification feed injector through a feed outlet of the tip portion. The method also includes radially securing the at least one ceramic tile to the outer wall via fastening the ceramic tile to the fastener, wherein the at least one ceramic tile wraps around a distal end portion of the tip portion.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a partial perspective view of an embodiment of a portion of the feed injector of FIG. 1 having a plurality of fasteners;

FIG. 4 is a cross-sectional view of an embodiment of the feed injector of FIG. 1 taken along line 4-4 of FIG. 2;

DETAILED DESCRIPTION OF THE INVENTION

Figure 1:
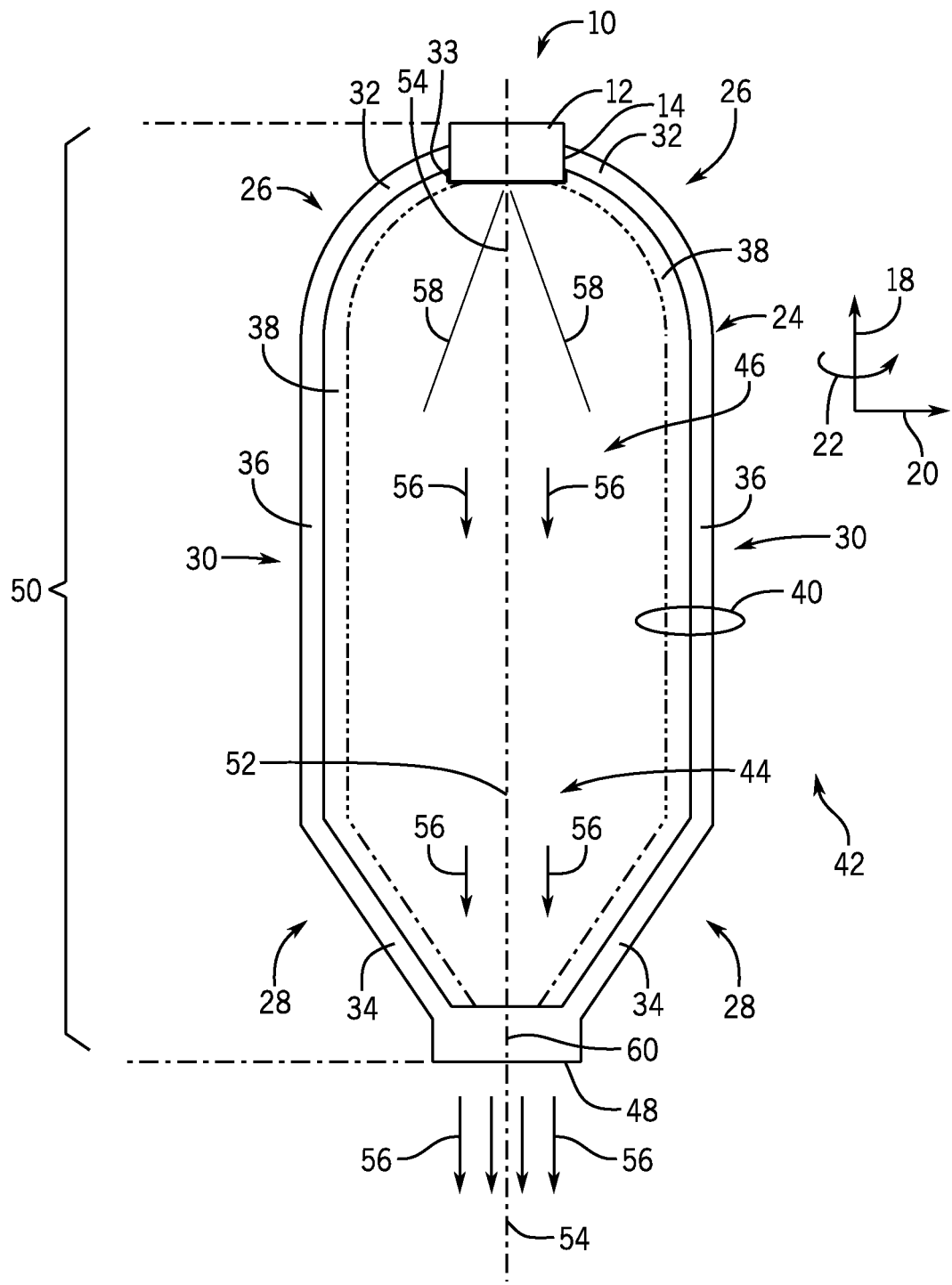
FIG. 1 is a cross-sectional side-view of an embodiment of a gasifier equipped with a feed injector having a heat shield.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A reactor or combustion system may utilize feed injectors to inject a fuel or feedstock, and optionally other fluids, into a combustion chamber. As used herein, combustion may include partial or complete combustion, gasification, partial oxidation, or other reaction of a feedstock, e.g., a carbonaceous fuel. For example, an (IGCC) power plant may have a gasifier that includes one or more gasification feed injectors. Because combustion occurs near a tip of the feed injector, the tip may be exposed to temperatures up to approximately 1,300 to 1,500 degrees Celsius (C). In addition, hot combustion gases may recirculate back toward the feed injector. To limit the exposure of the feed injector to high temperatures, temperature fluctuations, and high thermal strain, the disclosed embodiments equip a feed injector (e.g., a gasification feed injector) with a heat shield.

To address these issues, in various embodiments described below, a feed injector (e.g., gasification feed injector) may include a heat shield. The gasification feed injector includes a tip portion that has an outer wall and a feed outlet, and an injection axis of the gasification feed injector extends through the feed outlet of the tip portion. The gasification feed injector also includes at least one fastener extending radially from the outer wall relative to the injection axis. An attachment location of the at least one fastener is located away from the feed outlet of the tip portion. The system also includes the heat shield, which includes a tile radially located on the at least one fastener and radially secured to the outer wall via fastening the tile to the at least one fastener. In certain embodiments, the heat shield may include multiple tiles each disposed on a respective fastener. For example, multiple rows of tiles may be circumferentially disposed about the outer wall (e.g., in a stacked arrangement). In addition, the tile wraps around a distal end portion of the tip portion, which may face a large amount of hot recirculating gases. In certain embodiments, the gasification feed injector includes a ceramic tile, and the fastener is a threaded stud. The tile may be radially secured to the outer wall via at least a threaded fastener, such as a nut. Furthermore, an insulation layer, such as a ceramic fiber blanket, may damp vibrations from the feed injector and block heat from passing through the heat shield. In this manner, the disclosed embodiments may increase the life of the feed injector, reduce downtime, and increase operational efficiency of the entire plant.

Turning now to the drawings, FIG. 1 is a cross sectional side view of a gasifier 10 that includes an embodiment of a feed injector 12 (e.g., gasifier feed injector). As discussed below, the feed injector 12 may include a heat shield 14 composed of a plurality of tiles, which may fasten to a tip portion 16 of the feed injector 12 with a plurality of fasteners, such as threaded studs (see FIG. 2). The heat shield 14 may reduce thermal stress on the feed injector 12, and may be a more robust and easily serviceable heat blocking device for the feed injector 12. In further embodiments, the feed injector 12 may be disposed in similar devices, such as, but not limited to, a gas turbine engine, a combustion engine, a combustion system, a boiler, a furnace, a reactor, a combustor, or any combination thereof. The gasifier 10 may have an axial axis or direction 18, a radial axis or direction 20, and a circumferential axis or direction 22. The gasifier 10 includes an enclosure 24, also referred to as the shell, that functions as a housing or outer casing for the gasifier 10. The enclosure 24 includes a first end portion 26 and a second end portion 28. An intermediate portion 30 is defined by the section of the enclosure 24 that lies axially between the first end portion 26 and the second end portion 28. The first end portion 26 and the second end portion 28 include a dome-shaped top wall 32, and a triangular-shaped (e.g., conical shaped) bottom wall 34, respectively. A side wall 36 (e.g., annular side wall) parallel to the axis 18 is disposed in the intermediate portion 30 between the top wall 32 and the bottom wall 34.

The illustrated embodiment also includes a thermal barrier 38 concentrically disposed inside the enclosure 24. The thermal barrier 38 and the enclosure 24 form a wall assembly 40 that separates an exterior 42 of the gasifier 10 from an interior 44 of the gasifier 10. The interior 44 includes a gasification chamber 46, or combustion chamber, where pyrolysis, combustion, gasification, or a combination thereof, may occur. The wall assembly 40 is configured to block heat transfer and leakage of gaseous components from the interior 44 to the exterior 42 during gasification. Additionally, the thermal barrier 38 may be configured to maintain the surface temperature of the enclosure 24 within a desired temperature range. Accordingly, the thermal barrier 38 may include passive shielding, active cooling, or a combination thereof. For example, the thermal barrier 38, or refractory insulating lining, may be made of any material that maintains its predetermined physical and chemical characteristics upon exposure to high temperatures.

In the embodiment illustrated in FIG. 1, the feed injector 12 is disposed in the top wall 32 of the first end portion 26 of the enclosure 24. The feed injector 12 may be disposed in a neck 33 (e.g., a shaft) in the top wall 32, and there may be a small amount of clearance between the feed injector 12 and the neck 33. The feed injector 12 is longitudinally offset from an outlet 48 by a distance 50 and includes an injection axis 52 that determines the general orientation of the flow originating from the feed injector 12. The feed injector 12 may be configured to inject fuel, oxidant (e.g., oxygen, air, oxygen-enriched air, oxygen-reduced air, or any oxygen-containing mixture), cooling gas (e.g., carbon dioxide, nitrogen, or a flame resistant gas), or a mixture of fuel, oxygen, and cooling gas into the gasification chamber 46. For instance, the feed injector 12 may inject fuel in the form of a carbonaceous feedstock, such as coal, petroleum, or biomass. In fact, the feed injector 12 may inject any material suitable for the production of synthetic gas, or syngas, via gasification (e.g., organic materials, such as wood or plastic waste). In certain embodiments, the fuel may be a liquid slurry, such as a coal slurry. In other embodiments, the feed injector 12 may inject a controlled amount of oxygen and/or steam either alone or in combination with a suitable fuel.

In the illustrated embodiment, the injection axis 52 is parallel to the axis 18 and perpendicular to the radial axis 20 of the gasifier 10. In other words, the injection axis 52 is parallel to a longitudinal axis 54. Such a feature has the effect of directing a fluid flow emerging from the feed injector 12 in a generally downward direction (e.g., downstream flow direction), as indicated by arrows 56, through the gasification chamber 46 during use. In certain embodiments, the injection axis 52 may be directed away from the longitudinal axis 54 by an angle between approximately 0 to 45, 0 to 34, 0 to 24, or 0 to 10 degrees and all sub-ranges there between. Furthermore, certain embodiments of the feed injector 12 may provide a divergent spray, e.g., fluid flow originating from the feed injector 12 may diverge outward toward the side walls 36 in a generally downward direction (e.g., downstream flow direction), as indicated by reference numeral 58.

In the illustrated embodiment of the gasifier 10, the resultant syngas emerges from the gasifier 10 via outlet 48 along a path generally defined by outlet axis 60. That is, the syngas exits the gasifier 10 via a location in the bottom wall 34 of the gasifier 10. However, it should be noted that the gasifier design disclosed herein may be used with a variety of other gasification systems wherein the outlet is not disposed in a bottom wall. For instance, the disclosed embodiments may be used in conjunction with entrained flow gasifiers. In such embodiments, the direction of flow through the gasification chamber 46 may be upward through the gasifier 10, i.e., in a direction opposite arrows 56. In these systems, the resultant syngas may exit an outlet located on or near the top wall 32 of the gasifier 10, while the molten slag may exit through the bottom wall 34. For further example, the disclosed embodiments may be employed in fluidized bed gasifiers. Likewise, the outlet in such devices may be located near the top wall 32 of the gasifier 10 since the direction of flow is generally upward.

Figure 2:
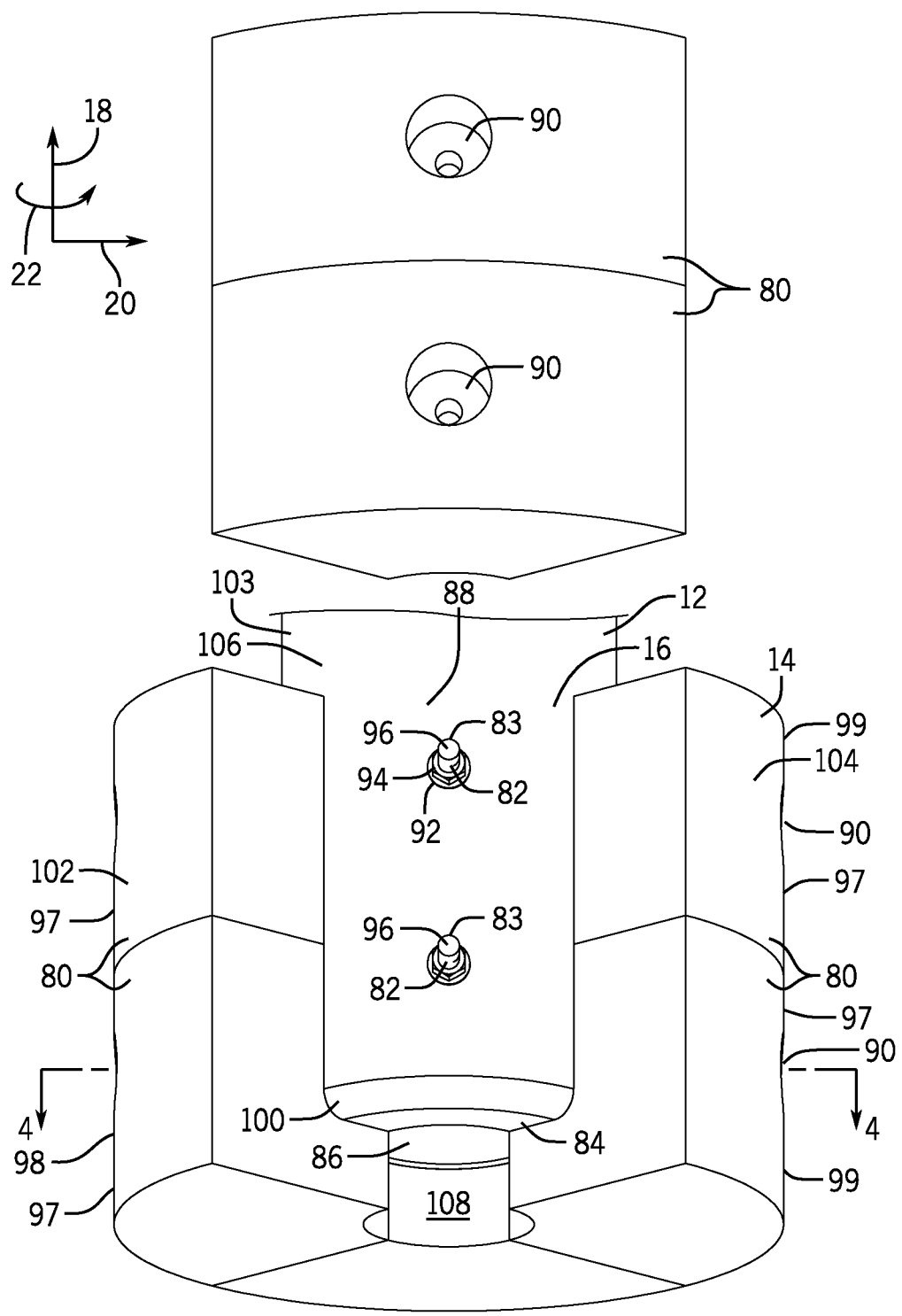
FIG. 2 is a partially exploded view of an embodiment of a portion of the feed injector of FIG. 1.

FIG. 2 is a partially exploded view of an embodiment of a portion of the tip portion 16 of the feed injector 12 of FIG. 1, taken within line 2-2, illustrating the heat shield 14. The heat shield 14 may include one or more tiles 80 and fasteners 82 (e.g., studs 83). In certain embodiments, the fasteners 82 may include hooks (see FIGS. 7 and 8) or any other type of fastener 82. Two tiles 80 have been exploded from the heat shield 14 to more clearly illustrate the fastening components of the heat shield 14. As noted in FIG. 1, the feed injector 12 may be disposed in a neck 33, leaving a small amount of clearance around the feed injector 12. Fuel passes through the feed injector 12, out through an annular opening or feed outlet 86, and into the gasification chamber 46. The tiles 80 may block hot recirculating gas from the gasification chamber 46 from coming into contact with a bottom face 84 of the feed injector 12 in the axial 18 direction, and making its way up the neck 33 and damaging the feed injector 12 from the radial 20 direction as well. The tip portion 16 of the feed injector 12 may include a plurality of fasteners 82, such as studs 83 (as depicted) or hooks (see FIGS. 7 and 8), extending radially 20 from an outer wall 88 of the feed injector 12 relative to the injection axis 52 of the gasification feed injector 12, and each fastener 82 may correspond to a respective heat-blocking tile 80. The studs 83 are configured to radially fasten the tiles 80 to the feed injector 12. Each stud 83 may include threads, and may pass into an opening 90 in the tile 80. One stud 83 may hold one tile 80, or in certain cases, multiple studs 83 may fasten a single tile 80. Once the stud 83 has passed into the opening 90 in the tile 80, a fastener or fasteners 82, such as a washer 92 and a nut 94, may secure the tile 80 to the stud 83 by threading onto a distal end 96 of the stud 83, and tightening radially 20 inward until the tile 80 is radially secured in place. The opening 90 in each tile 80 may be placed in the center of the tile 80, or in any other suitable location, and it may be a counter-bored hole that allows the fasteners 82 on the studs 83 (e.g., the washer 92 and the nut 94) to be recessed from an outer surface 97 of the tile 80.

Each heat-shielding tile 80 may cover a portion of the tip portion 16 of the feed injector 12, so that the outer wall 88 of the tip portion 16 is generally covered in order to block hot and/or corrosive combustion gases from damaging the feed injector 12. While the embodiment shown in FIG. 2 includes eight such tiles 80, any number of tiles 80 may be used. For example, the heat shield 14 may have about 1 to 100, 2 to 50, 3 to 25, 4 to 15, or 5 to 10 tiles 80. The tiles 80 may be distributed in any desired arrangement on the outer wall 88 of the feed injector 12 in a surface-covering manner. In certain embodiments, it may be desirable to arrange the tiles 80 in a series of rows, columns, or rings. In the embodiment shown, the tiles 80 are arranged in two circumferential 22 rows 99 (e.g., in a stacked arrangement). For example, a first plurality of studs 83 may be arranged in a first row 98 circumferentially around the outer wall 88. A tile 80 may be fastened to each stud 83, and each tile 80 may wrap circumferentially 22 around a distal end portion 100 of the tip portion 16. A second plurality of studs 83 may be arranged in a second circumferential row 102 on a body portion 103 upstream (e.g., axially 18 offset) of the tip portion 16 and upstream of first plurality of studs 83 relative to fuel flow through the feed injector 12. Tiles 80 may be radially fastened to each stud 83 of the second plurality of studs 83. Additional rows 99 of tiles 80 such as these may be fastened to the body portion 103 upstream of the tip portion 16 to enable a larger area of the outer wall 88 to be covered. For example, each illustrated tile 80 may be a wedge-shaped tile, truncated pie shaped tile, arcuate-shaped tile, or circular segment tile, which is a segment of an annular arrangement of tiles 80 around the tip portion 16. By further example, each tile 80 may be a full annular tile.

While the tiles 80 may be constructed from any suitable material, in some embodiments, the tiles 80 may be constructed of a material, such as a ceramic (e.g., silicon carbide, silicon nitride, etc.) having a higher heat resistance (approximately 1,370 degrees C.), a higher coefficient of thermal conductivity, and/or a lower coefficient of thermal expansion than the feed injector 12. By way of non-limiting example, the tiles 80 may be constructed from ceramics, composites, or combination thereof, such as silicon carbide, alumina, aluminum nitride, or mullite. These materials may effectively limit heat transfer to the tip portion 16 of the feed injector 12 (e.g., in the radial direction 20), and as a result, the tiles 80 may serve as a thermal barrier (or heat shield) for the tip portion 16 during gasification reactions. The tile 80 also may be described as thermal resistant tiles, corrosion resistant tiles, wear resistant tiles, protective tiles, or stress resistant tiles.

The tiles 80 may be configured to have substantially similar thicknesses in order to reduce temperature gradients across the heat shield 14. Furthermore, the tiles 80 may form a unified (e.g., flush) face 104. In other words, the tiles 80 may be tightly arranged, and no tile 80 may generally protrude significantly further in the radial 20 direction than any other tile 80. Such an arrangement may further reduce temperature gradients across the heat shield 14. Each tile 80 may be square, rectangular, quadrangular, round, or have the shape of a regular or irregular polygon. Tiles 80 of identical or different shape may be arranged adjacently. The tiles 80 may be shaped to conform to the contours of the feed injector 12, which may include coolant fluid conduits, and/or other irregularly shaped features. Specifically, some of the tiles 80 may wrap around the distal end portion 100 of the feed injector 12 in order to protect both the sides 106 and the bottom face 84 of the feed injector. The tiles 80 along the bottom face 84 of the feed injector 12 may form an annular opening 108 that generally extends around or mirrors the annular opening of the feed outlet 86 of the feed injector 12, so that the tiles 80 and the heat shield 14 do not interfere with fuel exiting the feed injector 12. The tiles 80 may interlock via a combination of recesses and protrusions (e.g., tongue and groove joints, dovetail joints, etc.) on the tiles (see FIG. 4) in order to provide a more effective heat shield 14.

Because each stud 83 extends radially 20 from the feed injector 12, the tiles 80 fastening near the bottom face 84 of the feed injector 12 (e.g., the tiles in the first circumferential row 98) may be shaped to extend radially 20 inward (e.g., toward the injection axis 52) to wrap, curve, or otherwise be shaped to cover a portion of both the sides 106 and the bottom 84 of the feed injector 12. The tiles 80 may have a high stiffness to maintain their shape while blocking heat along the bottom 84 of the feed injector 12, even when the tiles 80 are only attached radially (e.g., on the sides 106). In this way, the fastening components (e.g., the studs 83, the washers 92, and the nuts 94) may not directly face the hot recirculating gases produced in the gasification chamber 46, so they may have lower temperatures and experience reduced thermal stress. To further reduce the stress on the fastening components, a heat shield plug (see FIG. 4) may be placed in the opening 90, over the fastening components. In addition, an insulation layer (see FIG. 4) may be used to insulate the feed injector 12. Thus, the fastening components may have an increased lifespan. In addition, radial 20 installation of the tiles 80 may help retain the tiles 80 of the heat shield 14 from sliding off the studs 83 when the feed injector 12 is inserted into the gasifier 10 because the studs 83 are generally perpendicular to the axis 52 of the gasifier 10.

FIG. 3 is a partial perspective view illustrating a portion of an embodiment of the feed injector 12 having the plurality of fasteners 82 (e.g., the studs 83). The threaded studs 83 are shown, but it is understood that any other fasteners 82, such as hooks (see FIGS. 7 and 8) or clips, may be used. The studs 83 may be formed from a high temperature resistant material, (e.g., molybdenum, carbon steel, alloy steel, aluminum, titanium, or another material). The studs 83 may also have a heat resistant finish, such as a zinc, cadmium, tin, or copper finish. As described above, the studs 83 extend radially 20 away from the feed injector 12, and may be spaced in any manner on the feed injector 12 that will enable the plurality of tiles 80 to cover the outer wall 88 of the feed injector 12. For example, the studs 83 may be arranged in a series of rows 99, columns, or may be irregularly spaced on the feed injector. Any number of studs 83, such as about 1 to 100, 2 to 50, 3 5 to 25, or 10 to 15 studs 83, may be used. Each stud 83 may be welded, brazed, or otherwise attached to the outer wall 88 of the feed injector 12, so that tiles 80 may be fastened to them. In the embodiment shown, the studs 83 are arranged in two circumferential 22 rows 99, but any number of rows 99, such as about 1, 2, 3, 4, 5, 6, 7, 8, 9, 10, or more rows 99, may be used. As described above, each stud 83 may correspond to one tile 80, which may be disposed onto the stud 83 via the opening 90. Once the tile 80 has been disposed onto the stud 83, fasteners, such as the washer 92 and the nut 94, may secure the tile 80 to the outer wall 88 by being threaded onto the distal end 96 of the stud 83, and tightened radially 20 inward until the tile 80 is secured in place. Each stud 83 and/or each tile 80 may be removed, refurbished, and/or replaced individually, and the refurbished or new tile 80 may be installed onto the existing or the refurbished stud 83.

FIG. 4 shows a cross-sectional view of an embodiment of the feed injector 12, taken along line 4-4 in FIG. 2, having the tiles 80, the studs 83, the nuts 94, the washers 92, and the openings 90. As shown, the openings 90 in the tiles 80 may be counter-bored openings or holes that have a first portion 128 (e.g., a first bore) and a second portion 130 (e.g., a second bore). The counter-bore may be a cylindrical, flat-bottomed hole that enlarges to another coaxial hole (e.g., first and second coaxial holes of different diameters). The first portion 128 of the counter-bored opening 90 in the tile 80 may have a smaller diameter 129 than the second portion 130, which has an enlarged diameter 131 to allow fasteners, such as the washer 92 and the nut 94, to sit flush with or below an outer surface 97 of the tile 80. In the embodiment shown, the stud 83 extends entirely through the first portion 128 and partially extends into the second portion 130. This configuration may reduce thermal stress on the fastening components (e.g., the studs 83, the washers 92, and the nuts 94) of the heat shield 14. To provide further thermal protection to the fastening components, the second portion 130 of the opening 90 may have a plug 134, for example, made of a refractory castable, such as an alumina castable. The refractory castable plug 134 may fit into the second portion 130 of the opening 90, covering the distal end 96 of the stud 83, the washer 92, and the nut 94. The plug 134 may be flush with the outer surface 97 of the tiles 80, and may block hot recirculating gases from the gasification chamber 46 from contacting the stud 83, the washer 92, and the nut 94, thereby reducing their thermal stress and extending their lifetimes. Thus, the plug 134 may be a heat shield plug, protective plug, heat resistant plug, corrosion resistant plug, or any combination thereof.

In some embodiments, the tiles 80 may circumferentially 22 interlock about the outer wall 88 to block heat from passing between tiles 80 and reaching the feed injector 12. To interlock, the interlock structure of one tile 80 is configured to interlock with a mating interlock structure of an adjacent tile 80 (e.g., each pair of adjacent tiles 80 interlock with one another via at least one protrusion mating with at least one recess along an interface between the pair of adjacent tiles). For example, one side 135 of each tile 80 may have a protrusion 136 (e.g., a lip), and a second side 137, for example an opposite side, may have a complementary recess 138 (e.g., an indentation, groove, or cavity) to receive the protrusion 136. The protrusion 136 of one tile 80 may fit into the recess 138 of an adjacent tile 80, such that the tiles 80 form a unified heat shield 14. One or more (e.g., 1, 2, 3, 4, 5, or more) protrusions 136 and/or recesses 138 may be found on any or all edges of the tiles 80.

In certain embodiments, an insulation layer, such as a compressible fiber blanket 140, may be disposed in between the tiles 80 and the outer wall 88 of the feed injector 12. The fiber blanket 140 may be an alumina fiber blanket, ceramic fiber blanket, or any other kind of fiber blanket. The blanket 140 may damp vibrations, such as from fluid flow through the feed injector 12 and/or combustion dynamics in the gasifier 10 in order to protect the heat shield 14, and may furthermore provide insulation and reduce or eliminate the space between the tiles 80 and the feed injector 12. The blanket 140 may have openings 141 to enable the fasteners 82 (e.g., the studs 83) to pass through it, and may be otherwise generally shaped and configured to fit the contours of the feed injector 12.

Figure 5:
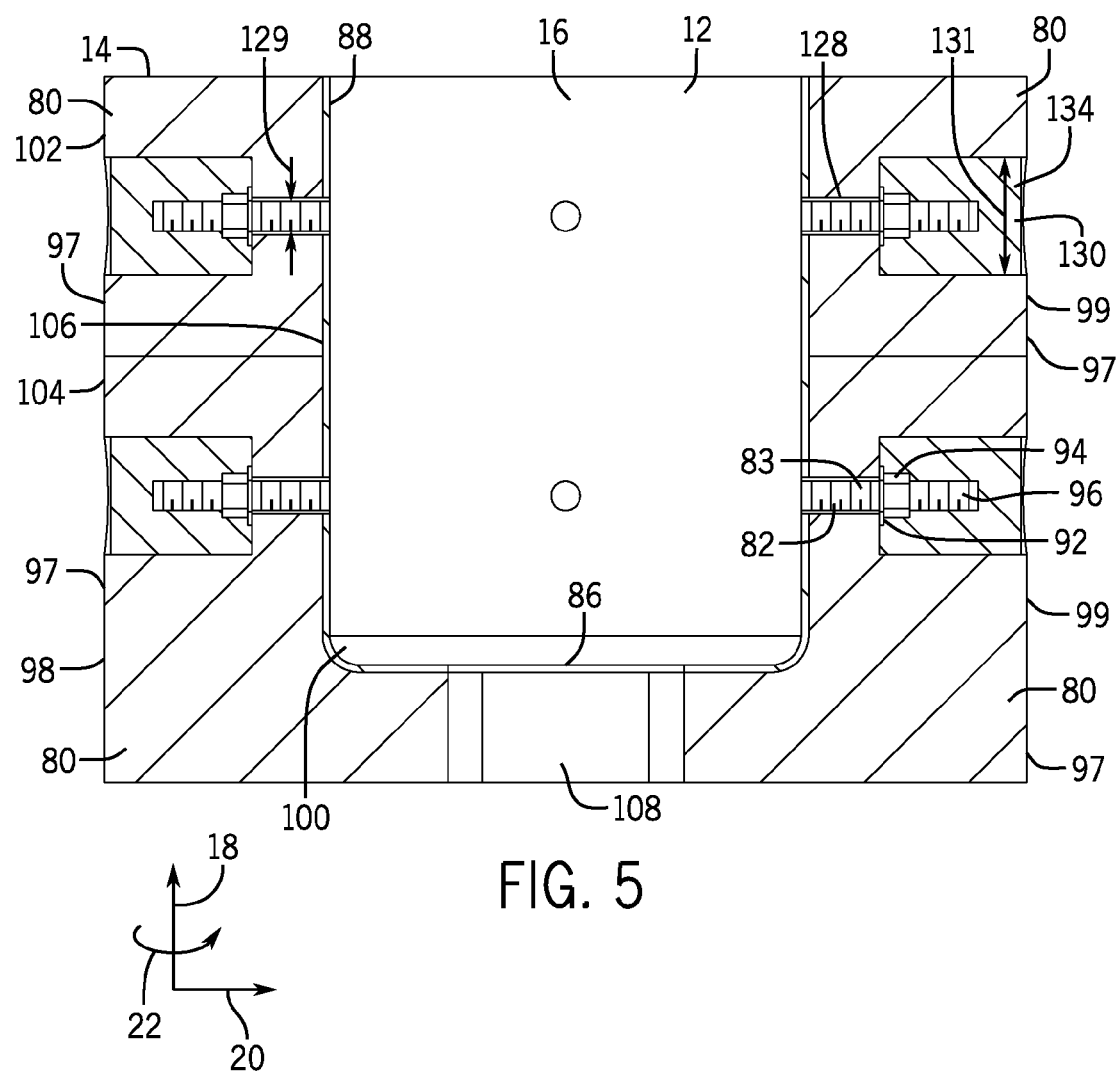
FIG. 5 is a cross-sectional side view of an embodiment of the feed injector of FIG. 1.

FIG. 5 is a partial cross sectional side view of an embodiment of the feed injector 12 having the tiles 80 circumferentially 22 stacked in two rows 99 around the tip portion 16. As shown, the outer wall 88 of the feed injector 12 is generally completely covered by the tiles 80. In addition, the tiles 80 and the plugs 134 create a unified or flush face 104. As in FIG. 1, the first circumferential row 98 covers the body of the tip portion 16, and the row 98 extends radially 20 inward to cover the bottom face 84 of the distal end portion 100. The second circumferential row 102 is disposed upstream (e.g., axially 18 offset) of the first circumferential row 98 relative to a flow of fuel through the injector 12, and any number of circumferential rows 99 may extend further upstream of the second circumferential row 102, such as about 1, 2, 3, 4, 5, 6, 7, 8, 9, 10, 15, 20, or more circumferential rows 99.

Figure 6:
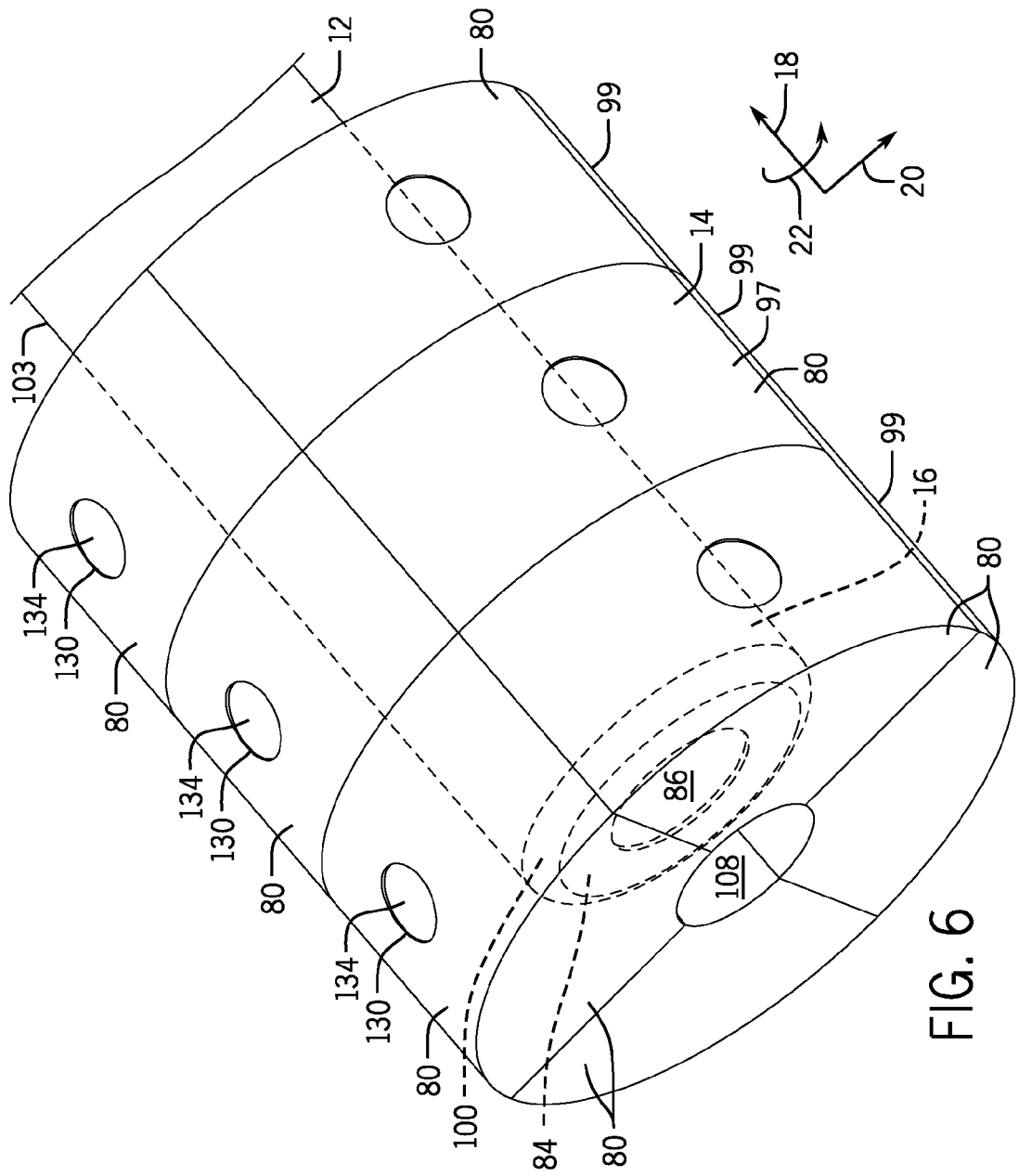
FIG. 6 is a perspective view of an embodiment of a portion of the feed injector of FIG. 1.

FIG. 6 shows an embodiment of the feed injector 12 with all the tiles 80 of the heat shield 14 in place. In this embodiment, the heat shield 14 includes three circumferential rows 99 of tiles 80. As shown, the tiles 80 generally completely cover the tip portion 16 of the feed injector 12. As the fastening components (e.g., the studs 83, the washers 92, and the nuts 94) are on the radial sides 106 of the feed injector 12, within the sealed counter-bore or opening 90 (e.g., covered by plugs 134), these components are protected from the gasifier environment. Because of reduced thermal stress on the fastening components, they may have a longer lifespan. The tiles 80 of the heat shield 14 may be removed, replaced, or refurbished without removing or replacing the fastening components, thereby reducing the cost to maintain the system 10.

Figure 7:
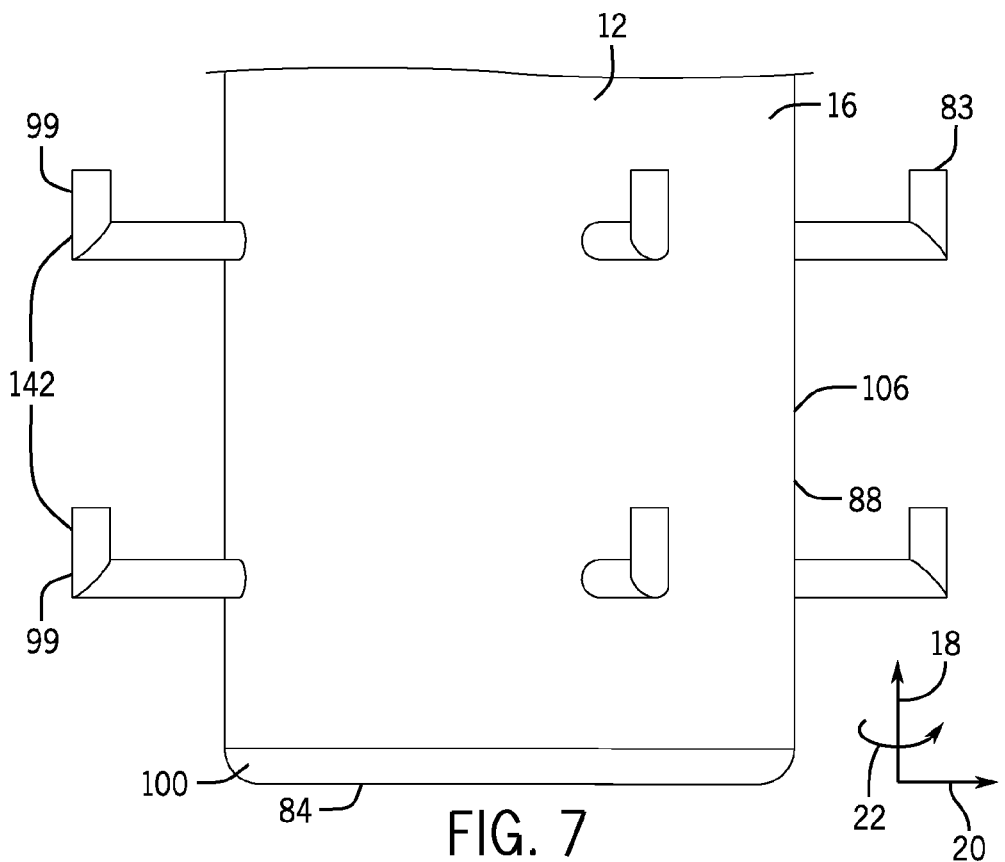
FIG. 7 is a perspective view of an embodiment of a portion of the feed injector of FIG. 1 having hooks for fasteners.

FIG. 7 shows an embodiment of the heat shield 14 that uses hooks 142, which may replace or supplement the studs 83, to fasten the tiles 80 to the outer wall 88 of the tip 16. As with the studs 83, any number of hooks 142 of any shape may be arranged in any suitable manner on the outer wall 88 of the feed injector 12. For example, the injector 12 may include 1, 2, 3, 4, 5, or more hooks 142 per tile 80, and the injector 12 may include 1 to 100, 2 to 50, 3 to 25, or 4 to 10 hooks 142 depending on the number of tiles 80 and rows 99. To allow the hooks 142 to fasten the tiles 80 to the feed injector 12, the opening 90 in each tile may be counter-bored or otherwise contoured to allow the hook 142 to pass through the tile 80 to secure the tile 80 in place.

Figure 8:
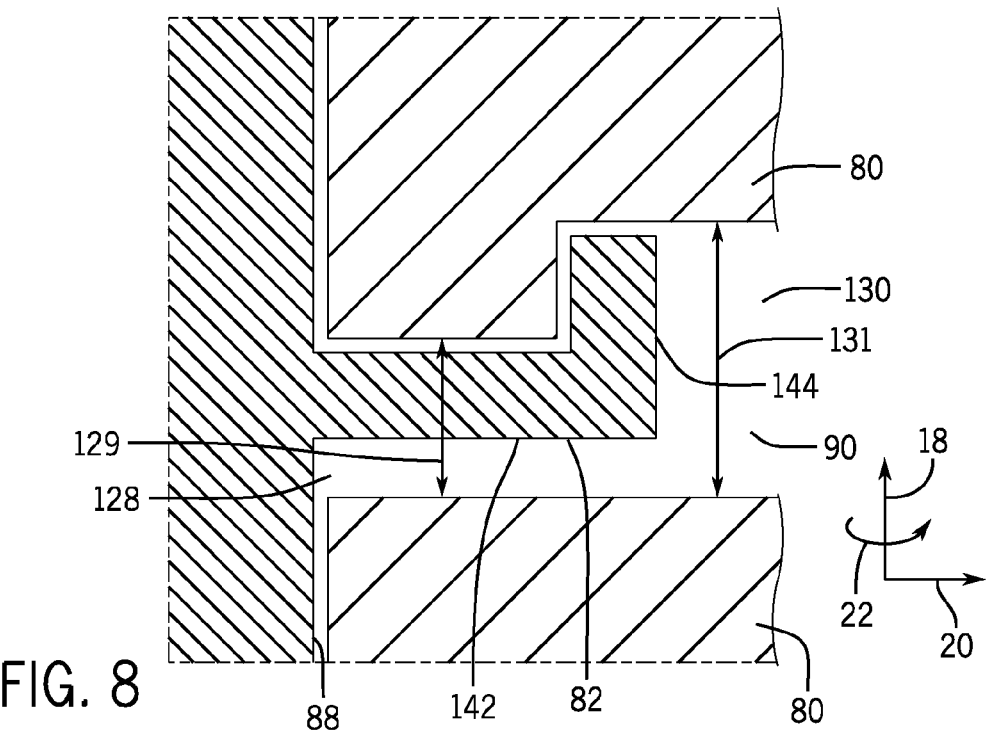
FIG. 8 is a cross-sectional side-view of an embodiment of the feed injector of FIG. 1 having hooks for fasteners.

FIG. 8 is a partial cross-sectional view of an embodiment of the tile 80 fastened to the hook 142. As shown, the opening 90 in the tile 80 may be a counter-bored opening, as described in FIG. 4. Thus, the opening 90 may have the first portion 128 (e.g., the first bore) of the opening 90 having the smaller diameter 129, and the second portion 130 (e.g., the second bore) of the opening 90 having the enlarged diameter 131 relative to the first diameter 129. A protruding portion of the hook 142 (e.g., a protrusion 144) may extend axially 18 from the hook 142. When the tile 80 is installed onto the hook 142, the tile 80 may be moved radially 20 inward (e.g., toward the feed injector 12) until the protrusion 144 of the hook 142 enters the second portion 130 of the opening 90. When the protrusion 144 enters the second portion 130 of the opening 90, the tile 80 may drop into place over the protrusion 144, thereby fastening the tile 80 to the feed injector 12.

Technical effects of the disclosed embodiments include a gasification feed injector 12 that includes a tip portion 16 that has an outer wall 88 and a feed outlet 86, and at least one fastener 82 extending radially 20 from the outer wall 88 relative to an injection axis 46 of the gasification feed injector 12 through the feed outlet 86 of the tip portion 16. An attachment location of the fastener 82 is located away from the feed outlet 86 of the tip portion 16. The system also includes a heat shield 14, which includes a tile 80 radially 20 located on the fastener 82 and radially 20 secured to the outer wall 88 via fastening the tile 80 to the fastener 82. In addition, the tile 80 wraps around a distal end portion 100 of the tip portion 16, which may face a large amount of hot recirculating gases. In certain embodiments, the tile 80 is ceramic and the fastener 82 is a threaded stud 83. The tile 80 may be radially 20 secured to the outer wall 88 via at least a threaded fastener, such as a nut 94. In this manner, the disclosed embodiments may reduce thermal stress on the fasteners 82 for the heat shield 14, which will increase the life of the feed injector 12, reduce downtime, and increase operational efficiency of the entire plant.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a gasification feed injector, comprising:
a tip portion comprising an outer wall and a feed outlet, wherein an injection axis of the gasification feed injector extends through the feed outlet of the tip portion; and
at least one fastener extending radially from the outer wall relative to the injection axis wherein an attachment location of the at least one fastener is located away from the feed outlet of the tip portion; and
a heat shield, comprising:
a tile radially disposed on the at least one fastener and radially secured to the outer wall via fastening the tile to the at least one fastener, wherein the tile wraps around a distal end portion of the tip portion; and
an insulation layer disposed between the outer wall and the tile, wherein the insulation layer has a first surface and a second surface disposed opposite the first surface, and the first surface directly contacts the outer wall and the second surface directly contacts the tile, and wherein the at least one fastener extends through a portion of the tile having the insulation layer disposed radially inward of the portion of the tile.

2. The system of claim 1, wherein the tile comprises a ceramic tile.

3. The system of claim 1, wherein the at least one fastener comprises a threaded fastener.

4. The system of claim 1, wherein the at least one fastener comprises a hook.

5. The system of claim 1, wherein the insulation layer comprises a first opening, the tile comprises a second opening radially aligned with the first opening, and the at least one fastener extends into the first and second openings.

6. The system of claim 5, wherein the heat shield comprises a heat shield plug disposed within the second opening over the at least one fastener to seal the second opening.

7. The system of claim 1, wherein the insulation layer comprises a compressible fiber blanket.

8. The system of claim 1, wherein the gasification feed injector comprises a first plurality of fasteners disposed in a first row circumferentially about the outer wall of the tip portion, wherein each fastener of the first plurality of fasteners extends radially from the outer wall and the attachment location of each fastener is located away from the feed outlet of the tip portion, and wherein the heat shield comprises a first plurality of tiles, wherein each tile of the first plurality of tiles is radially disposed on a respective fastener of the first plurality of fasteners and is radially secured to the outer wall via fastening each tile of the first plurality of tiles to the respective fastener of the first plurality of fasteners, and each tile wraps around the distal end portion of the tip portion.

9. The system of claim 8, wherein the gasification feed injector comprises a body portion located upstream of the tip portion and having the outer wall, and a second plurality of fasteners disposed in a second row circumferentially about the outer wall of the body portion, wherein each fastener of the second plurality of fasteners extends radially away from the outer wall, and wherein the heat shield comprises a second plurality of tiles, and each tile of the second plurality of tiles is radially disposed on a respective fastener of the second plurality of fasteners and is radially secured to the outer wall via fastening each tile of the second plurality of tiles to the respective fastener of the second plurality of fasteners.

10. The system of claim 8, wherein each pair of adjacent tiles of the plurality of tiles interlock with one another via at least one protrusion mating with at least one recess along an interface between the pair of adjacent tiles.

11. The system of claim 1, comprising a gasifier having the gasification feed injector.

12. A system comprising:
a heat shield for a gasification feed injector, comprising:
at least one ceramic tile configured to be radially disposed onto a fastener extending from an outer wall of a tip portion of the gasification feed injector, wherein the fastener extends radially from the outer wall relative to an injection axis of the gasification feed injector through a feed outlet of the tip portion, and the at least one ceramic tile is configured to be radially secured to the outer wall via fastening the tile to the fastener, wherein the at least one ceramic tile is configured to wrap around a distal end portion of the tip portion, and wherein the at least one ceramic tile comprises an interlock structure having a recess and a protrusion, wherein the interlock structure is configured to interlock with a mating interlock structure of an adjacent tile of the heat shield.

13. The system of claim 12, wherein the at least one ceramic tile comprises an opening to receive the fastener.

14. The system of claim 13, wherein the heat shield comprises a heat shield plug disposed within the opening over the fastener to seal the opening.

15. The system of claim 12, wherein the heat shield comprises a first plurality of ceramic tiles, and each ceramic tile of the first plurality of ceramic tiles is configured to be radially disposed onto a respective fastener of a first plurality of fasteners extending from the outer wall of the tip portion of the gasification feed injector, wherein each fastener of the first plurality of fasteners is configured to extend radially from the outer wall relative the injection axis, and the first plurality of fasteners form a first row circumferentially disposed about the outer wall of the tip portion, and wherein each ceramic tile of the first plurality of ceramic tiles is configured to be radially secured to the outer wall via fastening each ceramic tile of the first plurality of ceramic tiles to the respective fastener of the first plurality of fasteners, and each ceramic tile of the first plurality of ceramic tiles is configured to wrap around the distal end portion of the tip portion.

16. The system of claim 15, wherein the heat shield comprises a second plurality of ceramic tiles, and each ceramic tile of the second plurality of ceramic tiles is configured to be radially disposed onto a respective fastener of a second plurality of fasteners extending from the outer wall of a body portion of the gasification feed injector located upstream of the tip portion, wherein each fastener of the second plurality of fasteners is configured to extend radially from the outer wall relative the injection axis, and the second plurality of fasteners form a second row circumferentially disposed about the outer wall of the body portion, and wherein each ceramic tile of the second plurality of ceramic tiles is configured to be radially secured to the outer wall via fastening each ceramic tile of the second plurality of ceramic tiles to the respective fastener of the second plurality of fasteners.

17. A method, comprising:
radially disposing a first ceramic tile having a first opening onto a first fastener extending from an outer wall of a tip portion of a gasification feed injector by inserting the first fastener into the first opening, wherein the first fastener extends radially from the outer wall relative to an injection axis of the gasification feed injector through a feed outlet of the tip portion;
radially securing the first ceramic tile to the outer wall via fastening the first ceramic tile to the first fastener, wherein the first ceramic tile wraps around a distal end portion of the tip portion;
radially disposing a second ceramic tile having a second opening onto a second fastener extending from the outer wall of the tip portion by inserting the second fastener into the second opening, wherein the second fastener extends radially from the outer wall relative to the injection axis of the gasification feed injector, and the first and second ceramic tiles interlock with one another via at least one protrusion mating with at least one recess along an interface between the first and second ceramic tiles; and
radially securing the second ceramic tile to the outer wall via fastening the second ceramic tile to the second fastener, wherein the second ceramic tile wraps around the distal end portion of the tip portion.

18. The method of claim 17, comprising sealing the first opening of the first ceramic tile by disposing a heat shield plug within the first opening over the first fastener.

* * * * *